US012793898B2

(12) United States Patent
Nakamura et al.

(10) Patent No.: US 12,793,898 B2
(45) Date of Patent: Nov. 10, 2026

(54) MULTILAYER CERAMIC CAPACITOR AND MANUFACTURING METHOD THEREOF

(71) Applicant: Taiyo Yuden Co., Ltd., Tokyo (JP)

(72) Inventors: Keigo Nakamura, Tokyo (JP); Takashi Asai, Tokyo (JP); Michio Oshima, Tokyo (JP); Yoshinori Shibata, Tokyo (JP); Shunya Fukuda, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 222 days.

(21) Appl. No.: 18/611,974

(22) Filed: Mar. 21, 2024

(65) Prior Publication Data

US 2024/0331941 A1 Oct. 3, 2024

(30) Foreign Application Priority Data

Mar. 28, 2023 (JP) ................................ 2023-050999

(51) Int. Cl.

| | |
|---|---|
| ***H01G 4/12*** | (2006.01) |
| ***H01G 4/008*** | (2006.01) |
| ***H01G 4/012*** | (2006.01) |
| ***H01G 4/30*** | (2006.01) |

(52) U.S. Cl.

CPC ........... *H01G 4/1236* (2013.01); *H01G 4/008* (2013.01); *H01G 4/012* (2013.01); *H01G 4/30* (2013.01)

(58) Field of Classification Search

CPC ...... H01G 4/1236; H01G 4/008; H01G 4/012; H01G 4/30

See application file for complete search history.

(56) References Cited

U.S. PATENT DOCUMENTS

| | | | | |
|---|---|---|---|---|
| 6,349,026 B1 * | 2/2002 | Nakamura | B32B 18/00 | 361/309 |
| 2002/0046861 A1 * | 4/2002 | Yokoyama | H01G 4/232 | 174/565 |
| 2015/0016018 A1 * | 1/2015 | Onishi | H10N 30/872 | 310/365 |
| 2015/0318111 A1 * | 11/2015 | Lee | H01G 4/2325 | 29/25.03 |
| 2017/0345570 A1 * | 11/2017 | Sakatsume | H01G 4/2325 | |

FOREIGN PATENT DOCUMENTS

| | | |
|---|---|---|
| JP | 2000348964 | 12/2000 |

* cited by examiner

*Primary Examiner* — Michael P Mcfadden
(74) *Attorney, Agent, or Firm* — CHIP LAW GROUP

(57) ABSTRACT

Provided is a multilayer ceramic capacitor including an element body having a multilayer body in which dielectric layers formed of a dielectric ceramic and internal electrodes containing a metal as a main component are stacked, and a protective portion that covers a surface of the multilayer body, and an external electrode that is disposed on a surface of the element body and is electrically connected to the internal electrodes, the external electrode having a conductor portion formed of a metal containing copper as a main component element and a ceramic portion formed of a ceramic material having composition similar to composition of the dielectric ceramic. A bending ceramic portion that is disposed to penetrate between a surface in contact with the element body in the conductor portion and a surface opposed to the surface and in which a path of the penetration bends is included in the ceramic portion.

8 Claims, 5 Drawing Sheets

MULTILAYER CERAMIC CAPACITOR AND MANUFACTURING METHOD THEREOF

CROSS REFERENCE TO RELATED APPLICATIONS

This application claims priority benefit of Japanese Patent Application No. JP 2023-050999 filed in the Japan Patent Office on Mar. 28, 2023. Each of the above-referenced applications is hereby incorporated herein by reference in its entirety.

BACKGROUND

The present disclosure relates to a multilayer ceramic capacitor and a manufacturing method thereof.

A multilayer ceramic capacitor is mounted on a circuit board by soldering external electrodes formed on a surface of an element body including a multilayer body of a dielectric ceramic and internal electrodes to land electrodes on the circuit board. Thermal stress is generated in the external electrode due to heat applied at a time of the soldering to the circuit board, temperature change of the environment in which the circuit board is placed, or the like, and a crack is generated from an end portion of the external electrode to an inside of the element body due to this thermal stress in some cases.

The crack that has developed from the end portion of the external electrode to the inside of the element body becomes an infiltration route of deterioration factors such as water to cause lowering of the electrical insulation, and reaches the internal electrode and lowers its continuity to cause lowering of the capacitance. Thus, countermeasures for reducing the thermal stress that causes the crack are taken.

As one example, Japanese Patent Laid-open No. 2000-348964 (hereinafter, Patent Document 1) discloses employing external electrodes in which columnar ceramic portions extending in a thickness direction of a conductor layer are present in a dispersed manner.

SUMMARY

In the multilayer ceramic capacitor having the structure disclosed in Patent Document 1, interfaces between the conductor layer and the ceramic portion in the external electrode are formed in a substantially straight line manner in the thickness direction of the conductor layer. Thus, there is a problem that, when a gap is generated between the conductor layer and the ceramic portion due to difference in shrinkage behavior between both in association with temperature change at a time of firing or at a time of mounting on a circuit board, deterioration factors such as water infiltrate through the gap and easily reach the element body.

Thus, a desire of the present disclosure is to provide a multilayer ceramic capacitor in which generation of a crack at a time of mounting on a circuit board and at a time of use is suppressed and infiltration of deterioration factors via an external electrode is suppressed.

The present inventor has made various studies in order to solve the above-described problem. As a result, the present inventor has found out that the above-described object can be achieved by the following technique, and has reached the completion of the present disclosure. Specifically, in obtaining a multilayer ceramic capacitor through simultaneous firing of an element body and external electrodes, what contains ceramic particles having composition similar to that of a ceramic material contained in the element body and metal particles containing copper as a main component element is used as paste for the external electrode. In addition, the firing condition is set to a condition in which the element body is kept for a comparatively long time at a temperature at which the metal particles turn to a spherical shape. This forms the external electrodes with a structure in which ceramic portions that bend penetrate a conductor part.

Specifically, a first mode of the present disclosure for solving the above-described problem is a multilayer ceramic capacitor including an element body having a multilayer body in which dielectric layers formed of a dielectric ceramic and internal electrodes containing a metal as a main component are stacked alternately, and a protective portion that covers a surface of the multilayer body, and an external electrode that is disposed on a surface of the element body and is electrically connected to the internal electrodes, the external electrode having a conductor portion formed of a metal containing copper as a main component element and a ceramic portion formed of a ceramic material having composition similar to composition of the dielectric ceramic. A bending ceramic portion that is disposed to penetrate between a surface in contact with the element body in the conductor portion and a surface opposed to the surface and in which a path of the penetration bends is included in the ceramic portion.

Furthermore, a second mode of the present disclosure for solving the above-described problem is a manufacturing method of the multilayer ceramic capacitor according to the first mod. The manufacturing method includes preparing powder of a dielectric ceramic composition, mixing the powder of the dielectric ceramic composition with a binder and shaping a mixture into a sheet shape to obtain a green sheet, forming an internal electrode pattern containing a metal on the green sheet, obtaining a green multilayer body through executing pressure bonding after stacking a predetermined number of the green sheets on which the internal electrode pattern is formed and disposing green sheets for a cover layer at both end portions in a layer-stacking direction, dicing the green multilayer body to obtain a before-firing element body, removing the binder from the before-firing element body, causing paste for an external electrode containing metal particles containing copper as a main component element and ceramic particles having composition similar to composition of the dielectric ceramic composition to adhere to a surface of the before-firing element body resulting from the removal of the binder, and firing the before-firing element body to which the paste for the external electrode adheres to obtain a sintered body.

According to the present disclosure, it is possible to provide a multilayer ceramic capacitor in which generation of a crack at a time of mounting on a circuit board and at a time of use is suppressed and infiltration of deterioration factors via an external electrode is suppressed.

DETAILED DESCRIPTION OF THE PREFERRED EMBODIMENTS

Configurations and operations and effects of the present disclosure will be described below in conjunction with technical ideas with reference to the drawings. However, estimation is included regarding operational mechanisms and whether or not the estimation is correct does not limit the present disclosure.

[Multilayer Ceramic Capacitor]

Figure 1:
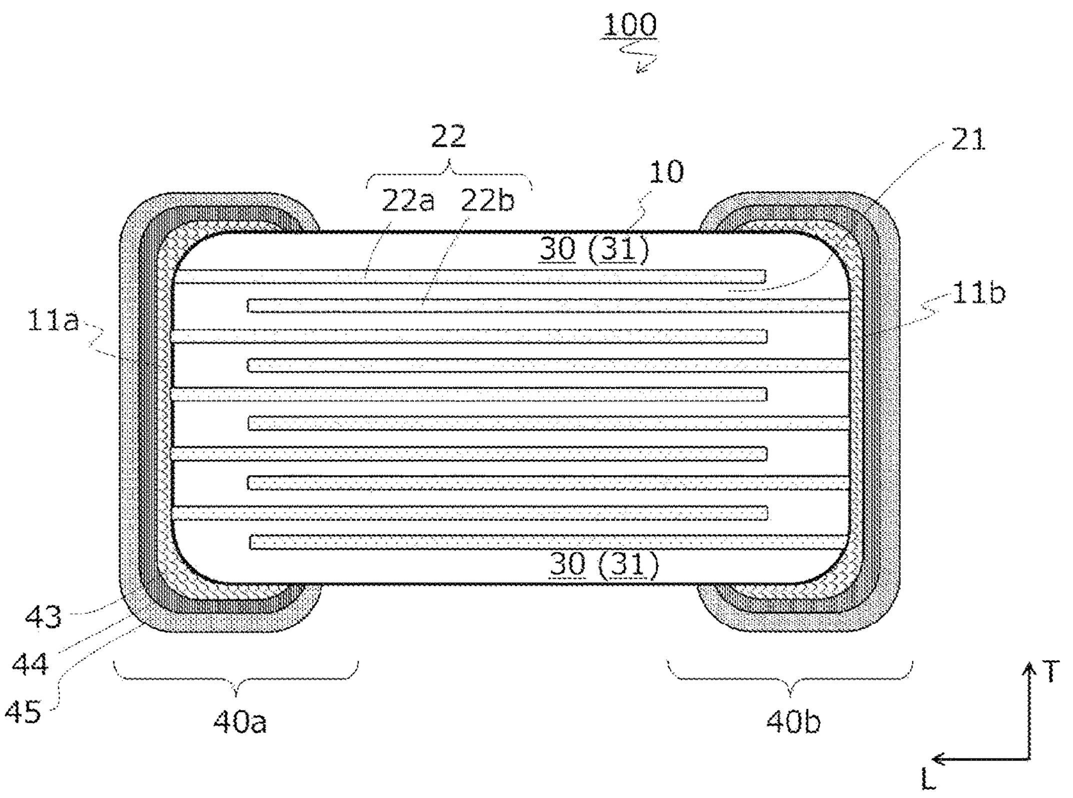
FIG. 1 is a schematic diagram (a sectional view along a length direction) illustrating a structure of a multilayer ceramic capacitor according to a first embodiment of the present disclosure.

An embodiment of the multilayer ceramic capacitor according to a first mode of the present disclosure is illustrated in FIG. 1 as a first embodiment. A multilayer ceramic capacitor 100 according to the first embodiment has a rectangular parallelepiped shape and includes pairs of surfaces that are each orthogonal to one of three axes orthogonal to each other, that is, an L-axis that is a length direction, a W-axis that is a width direction, and a T-axis that is a height direction. The rectangular parallelepiped is not limited to the rectangular parallelepiped mathematically defined, and it suffices that the rectangular parallelepiped is a shape recognized as a rectangular parallelepiped when the overall shape is observed. Thus, a shape in which a ridge portion or a corner portion is rounded, a shape in which a ridge portion is a curve, and a shape in which a surface that configures the shape is a curved surface with a small curvature are also equivalent to the rectangular parallelepiped in the present disclosure. The size in the length (L) direction, the size in the width (W) direction, and the size in the height (T) direction regarding the ceramic capacitor 100 can each independently take any value, and the magnitude relation among them is also not limited. For example, (size in L direction)>(size in W direction)≥(size in T direction) may be satisfied. Alternatively, (size in W direction)>(size in L direction) may be satisfied, and (size in T direction)>(size in W direction) may be satisfied.

Figure 2:
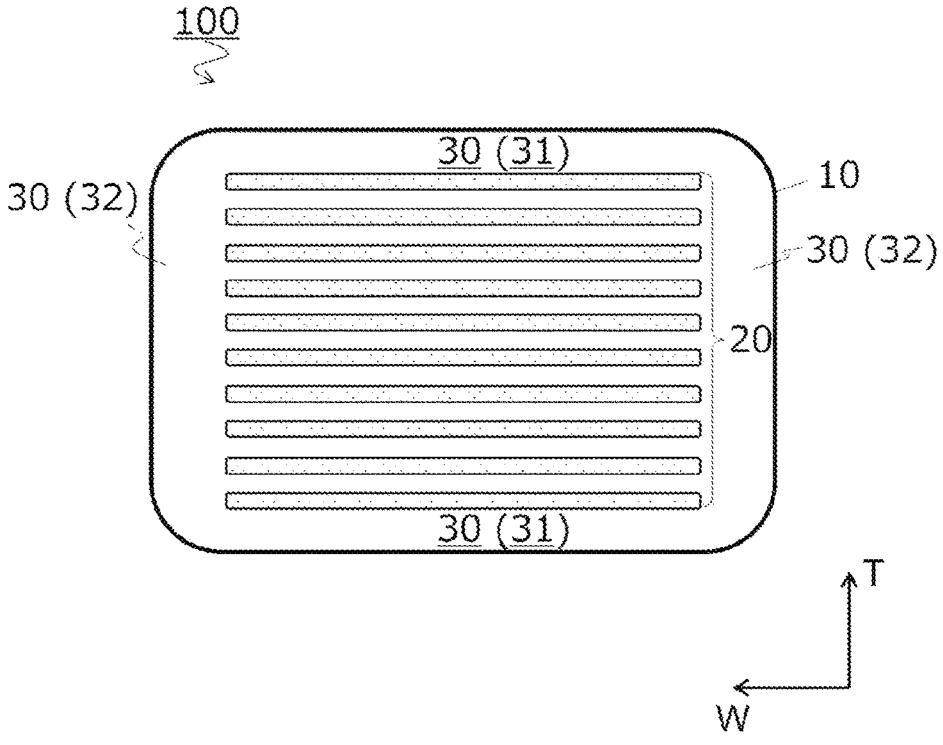
FIG. 2 is a schematic diagram (a sectional view along a width direction) illustrating the structure of the multilayer ceramic capacitor according to the first embodiment of the present disclosure.

As illustrated in FIG. 1 (LT section) and FIG. 2 (WT section), which are schematic sectional views of the multilayer ceramic capacitor 100, the multilayer ceramic capacitor 100 according to the first embodiment includes an element body 10 having a multilayer body 20 in which dielectric layers 21 formed of a dielectric ceramic and internal electrodes 22 composed mainly of a metal are alternately stacked in the T direction and a protective portion 30 that covers a surface of the multilayer body 20.

The element body 10 has lead-out portions 11 (11*a* and 11*b*) to which internal electrodes 22 (22*a* and 22*b*) of every second layer are led out on surfaces parallel to the layer-stacking direction (T direction). That is, the element body 10 has the lead-out portion 11*a* to which the internal electrodes 22*a* are led out in the L direction and the lead-out portion 11*b* to which the internal electrodes 22*b* are led out in the L direction. In the multilayer ceramic capacitor 100 illustrated in FIG. 1, the pair of lead-out portions 11*a* and 11*b* are each formed on substantially the whole of one of surfaces that are perpendicular to the L direction of the element body 10 and are opposed to each other. However, the arrangement of the lead-out portion in the multilayer ceramic capacitor according to the first mode of the present disclosure is not limited thereto. The lead-out portion may be formed only in part in the surface parallel to the layer-stacking direction or may be formed only in one surface. Furthermore, a plurality of pairs of the lead-out portions may be formed. Moreover, the lead-out portion is not limited to the object to which the internal electrodes are directly led out and may be an object to which a connecting conductor that electrically connects the internal electrodes of the same polarity to each other is led out as in a second modification example to be described later.

On a surface of the element body 10 other than the lead-out portions, the protective portion 30 is disposed to cover the surface of the multilayer body 20. The protective portion 30 includes cover portions 31 disposed on surfaces perpendicular to the T direction and side margin portions 32 disposed on surfaces perpendicular to the W direction.

The multilayer ceramic capacitor 100 according to the first embodiment includes external electrodes 40*a* and 40*b* that are disposed on the surface of the element body 10 and electrically connect the internal electrodes 22*a* and 22*b*, respectively, led out to the lead-out portions 11*a* and 11*b* to each other.

Detailed description will be made below regarding the components that configure the multilayer ceramic capacitor 100 according to the first embodiment.

(Dielectric Layer)

The dielectric layer 21 is formed of a dielectric ceramic. Composition of the dielectric ceramic is not particularly limited to any type as long as it is such composition as to form a dense dielectric ceramic through simultaneous firing with electrodes (the internal electrodes 22 and the external electrodes 40) to be described later, and may be selected as appropriate according to characteristics required for the multilayer ceramic capacitor. As composition examples of the dielectric ceramic, composition containing calcium zirconate ($CaZro_3$) as the main component, composition containing calcium titanate ($CaTiO_3$) as the main component, composition containing barium titanate ($BaTiO_3$) as the main component, composition containing strontium titanate ($SrTiO_3$) as the main component, composition containing $Ba_{1-x-y}Ca_xSr_yTi_{1-z}Zr_2O_3$ having a perovskite structure as the main component, and so forth are cited. Among them, the composition containing calcium zirconate ($CaZro_3$) as the main component is preferable in that a dense dielectric ceramic is obtained through firing at a comparatively low temperature. The dielectric ceramic may be a substance containing an additive element in addition to the main component. As the additive element, at least one kind selected from Mo, Nb, Ta, W, Mg, Mn, V, Cr, rare earth elements (Y, Sm, Eu, Gd, Tb, Dy, Ho, Er, Tm, and Yb), Co, Ni, Li, B, Na, K, and Si is cited as an example. The additive element may be contained as a single element or may be contained in the form of a compound typified by oxides, nitrides, and carbides. Furthermore, the additive element may be present in a state in which it is solid-solved in the main component, or may form a different phase from the elements that configure the main component or another additive element.

(Internal Electrode)

The internal electrodes 22 (22*a*, 22*b*) contain a metal as the main component. The kind of the metal is not particularly limited. However, a metal containing copper (Cu) or nickel (Ni) as the main component element is preferable because simultaneous firing with the dielectric layers 21 is possible and the price is low. Among them, a metal containing Cu as the main component element is preferable in that the multilayer ceramic capacitor 100 becomes one with low equivalent series resistance (ESR). As the metal containing Cu as the main component element, Cu and Cu alloys are cited as examples. Here, the "main component element" in the present disclosure means the element regarding which the content represented in atomic percentage (at %) is the highest.

The internal electrodes 22 may contain dielectric particles having composition similar to that of the dielectric ceramic that configures the dielectric layers 21 or a glass component besides the metal.

(Protective Portion)

The protective portion 30 includes the cover portions 31 disposed on the surfaces perpendicular to the T direction in the multilayer body 20 and the side margin portions 32 disposed on the surfaces perpendicular to the W direction, and has a function of protecting the dielectric layers 21 and the internal electrodes 22.

The material of the protective portion 30 is not limited to any particular kind as long as it has high electrical insulation and low permeability to deterioration factors such as water. It is preferable to employ the same main component as the dielectric ceramic that forms the dielectric layers 21 as the main component of the protective portion 30 in terms of making shrinkage in firing uniform in manufacturing of the multilayer ceramic capacitor 100, alleviation of internal stress in the multilayer ceramic capacitor 100, and so forth.

(External Electrode)

The external electrodes 40 (40*a* and 40*b*) are disposed on the surface of the element body 10 and are electrically connected to the internal electrodes 22 (22*a* and 22*b*) led out to the lead-out portions 11 (11*a* and 11*b*). In the multilayer ceramic capacitor according to the first mode, the arrangement of the lead-out portion is not limited to that illustrated in FIG. 1 as described above. Thus, it is obvious that the arrangement of the external electrode is also not limited thereto.

The external electrodes 40 (40*a* and 40*b*) each have a conductor portion 41 formed of a metal containing copper (Cu) as the main component element. Because the metal that forms the conductor portion 41 is a metal containing Cu with high electrical conductivity as the main component element, the multilayer ceramic capacitor 100 becomes one with low equivalent series resistance (ESR). As the metal containing Cu as the main component element, Cu and Cu alloys are cited as examples.

The external electrodes 40 (40*a* and 40*b*) have a ceramic portion 42 formed of a ceramic material having composition similar to that of the dielectric ceramic that forms the dielectric layers 21. It suffices that the ceramic portion 42 is a portion in which the kind of contained elements corresponds with that of the main component of the dielectric ceramic that forms the dielectric layers 21. In terms of enhancing the bonding strength between a bending ceramic portion 421 to be described later and the element body 10 and improving the effect of suppression of thermal stress applied to the element body 10, it is preferable that the ceramic portion 42 be a portion in which the kind of contained elements corresponds with that of all elements contained in the dielectric ceramic composition that forms the dielectric layers 21, and it is more preferable that the ceramic portion 42 be a portion in which even the ratio of each of contained elements corresponds with that of the dielectric ceramic composition.

Figure 3:
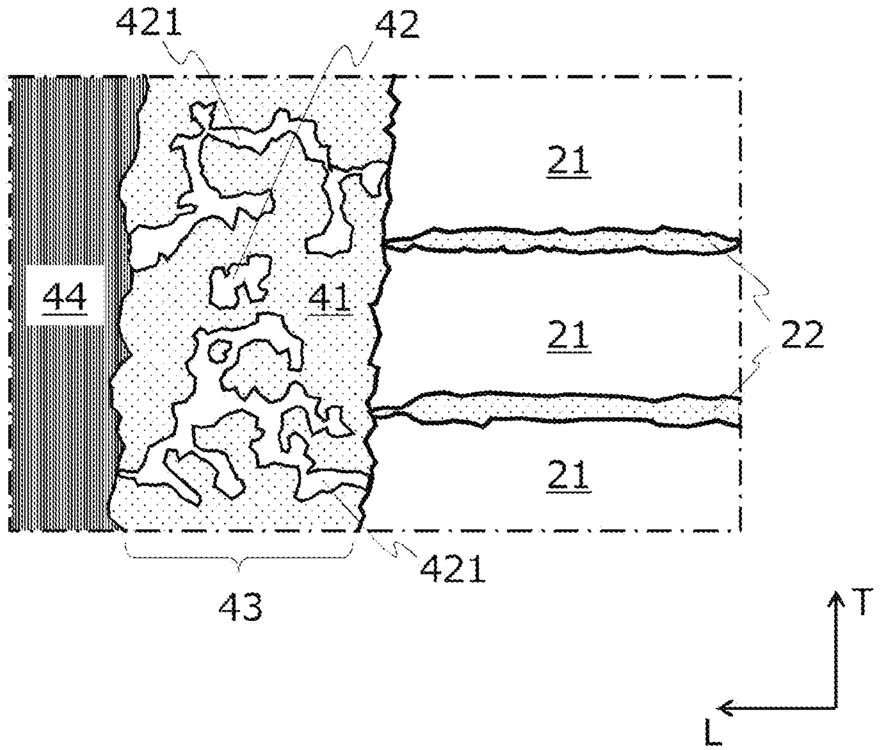
FIG. 3 is a schematic diagram (a sectional view along the length direction) illustrating a structure of an external electrode of the multilayer ceramic capacitor according to the first embodiment of the present disclosure.

As illustrated in FIG. 3, the ceramic portion 42 includes the bending ceramic portion 421 that is disposed to penetrate between the surface in contact with the element body 10 in the conductor portion 41 and the surface opposed to this surface and in which the path that penetrates the conductor portion 41 bends. One end of the ceramic portion 42 disposed to penetrate between the surface in contact with the element body 10 in the conductor portion 41 and the surface opposed to this surface is bonded and fixed to the surface of the element body 10 having composition similar to that of the ceramic portion 42. The ceramic portion 42 has a smaller thermal expansion coefficient compared with the conductor portion 41. Therefore, due to the fixing of the one end to the element body 10 and the disposing with the penetration of the conductor portion 41, the ceramic portion 42 functions as an anchor that suppresses deformation of the conductor portion 41 attributed to heat applied at a time of soldering to a circuit board, temperature change of the environment in which the circuit board is placed, or the like. Thus, since the ceramic portion 42 includes a portion which is disposed to penetrate between the surface in contact with the element body 10 in the conductor portion 41 and the surface opposed to this surface, thermal stress applied from the external electrodes 40 (40*a* and 40*b*) to the element body 10 is suppressed, and generation of a crack in the element body 10 is thereby suppressed.

Furthermore, due to the disposing of the ceramic portion 42 with the penetration of the conductor portion 41, the contact area between the ceramic portion 42 and the element body 10 and the area of the ceramic portion 42 exposed in the surface of the conductor portion 41 when the volume ratio of the ceramic portion 42 is the same become smaller compared with the case in which the ceramic portion 42 is disposed in the conductor portion 41 in a dispersed manner. Thus, the contact area between the conductor portion 41 and the internal electrodes 22 can be increased, and the electrical conductivity can be kept. In addition, in the case of forming the external electrodes with a multilayer structure with use of the conductor portion 41 and the ceramic portion 42 as an underlying layer 43 as illustrated in FIG. 1 and FIG. 2, the contact area between a metal layer formed on the surface and the conductor portion 41 also increases, and therefore, it is also possible to enhance the adhesion strength between the layers.

Figure 4:
FIG. 4 is an explanatory diagram illustrating a definition of a bending ceramic portion.

Moreover, the ceramic portion 42 disposed to penetrate between the surface in contact with the element body 10 in the conductor portion 41 and the surface opposed to this surface is the bending ceramic portion 421 whose penetrating path bends. Due to this, a gap becomes less likely to be generated between the conductor portion 41 and the ceramic portion 42 compared with the case in which the ceramic portion 42 has a path with a substantially straight line shape. In addition, even when a gap is generated, this gap becomes a bending gap. Thus, the arrival of deterioration factors such as water to the element body 10 is suppressed. Here, the "bending ceramic portion" in the present disclosure refers to the ceramic portion 42 that requires, as illustrated in FIG. 4, three or more line segments when one end and the other end of the ceramic portion 42 are linked to each other by only line segments that pass inside the ceramic portion 42 in an optical microscope image obtained when the ceramic portion 42 that penetrates the conductor portion 41 is observed at a magnification at which the whole of the ceramic portion 42 falls into the field of view.

In the bending ceramic portion 421, it is preferable that the tortuosity of the path that penetrates the conductor portion 41 be equal to or higher than 1.1 and equal to or lower than 7.0. When the tortuosity is equal to or higher than 1.1, generation of a gap between the bending ceramic portion 421 and the conductor portion 41 is significantly suppressed. In addition, the arrival of deterioration factors to the element body 10 when a gap has been generated is significantly suppressed. In terms of further enhancement in the above-described effects, it is more preferable that the tortuosity be equal to or higher than 1.3, and it is further preferable that the tortuosity be equal to or higher than 1.5, and it is particularly preferable that the tortuosity be equal to or higher than 1.8. On the other hand, when the tortuosity is equal to or lower than 7.0, the electrical conductivity of the external electrodes 40 (40*a* and 40*b*) can be made sufficient, and ESR can significantly be reduced. In terms of further enhancement in the above-described effects, it is more preferable that the tortuosity be equal to or lower than 6.8, and it is further preferable that the tortuosity be equal to or lower than 6.6, and it is particularly preferable that the tortuosity be equal to or lower than 6.4. From the above, it is more preferable that the tortuosity be equal to or higher than 1.3 and equal to or lower than 6.8, and it is further preferable that the tortuosity be equal to or higher than 1.5 and equal to or lower than 6.6, and it is particularly preferable that the tortuosity be equal to or higher than 1.8 and equal to or lower than 6.4.

Figure 5A:
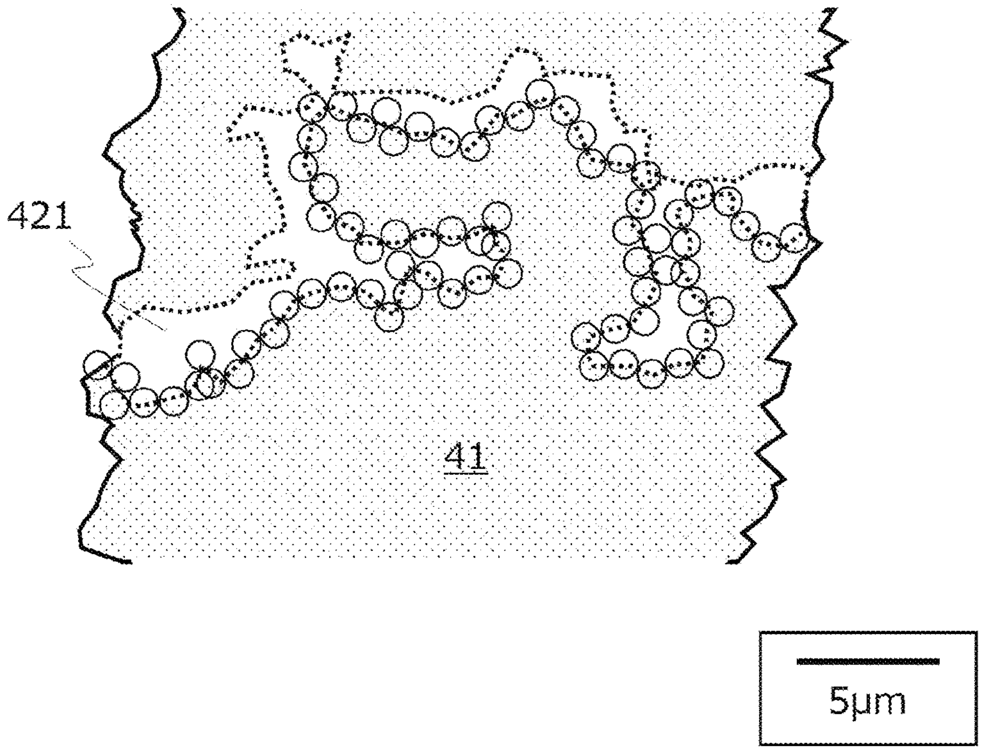
FIG. 5A is an explanatory diagram illustrating how to obtain the length of the bending ceramic portion in decision of a tortuosity of the bending ceramic portion.
Figure 5B:
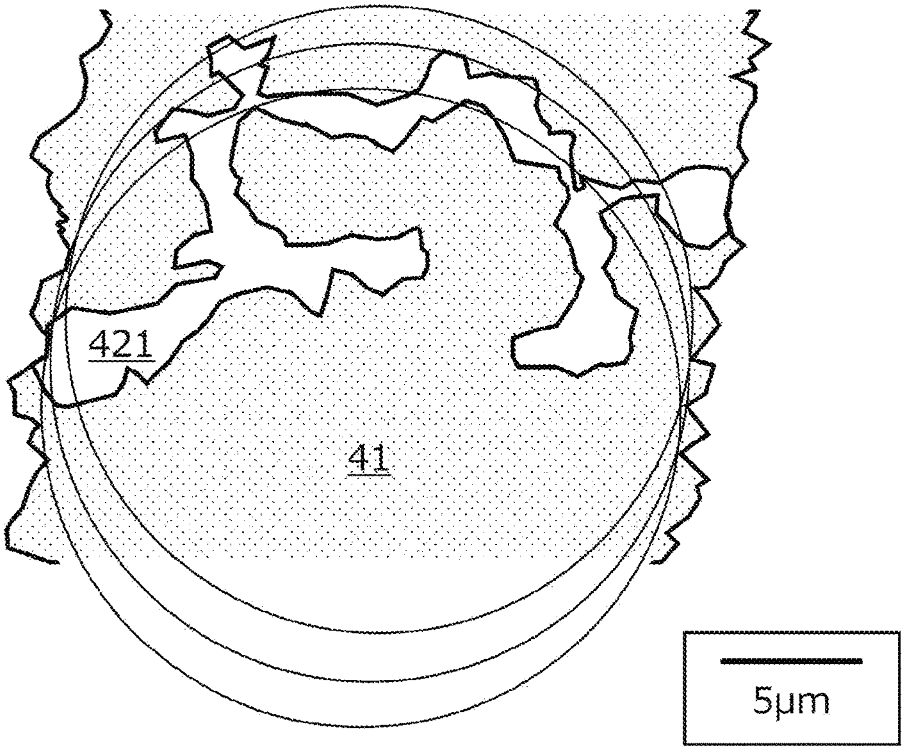
FIG. 5B is an explanatory diagram illustrating how to obtain a thickness of a conductor portion in the decision of the tortuosity of the bending ceramic portion.

Here, the tortuosity of the bending ceramic portion 421 in the present disclosure is decided in the following procedure. First, the multilayer ceramic capacitor 100 is cut along a plane that passes through the vicinity of a central portion in the width direction (W direction) and is parallel to the layer-stacking direction (T direction), and is buried in a resin, with the section exposed. Then, mirror surface polishing of the section is executed to form a polished surface. Subsequently, the portion of the external electrode 40 in the polished surface is observed with an optical microscope at a magnification at which the whole of the bending ceramic portion 421 falls into the field of view, and an optical microscope image is acquired. Next, as illustrated in FIG. 5A, along the contour of the bending ceramic portion 421, that is, the boundary portion between the conductor portion 41 and the bending ceramic portion 421, observed in the obtained optical microscope image, a plurality of circles having a diameter corresponding to 1 μm in the image are disposed from one end to the other end of the bending ceramic portion 421 in such a manner as to be in contact with each other on the contour. At this time, the circle disposed first is placed at a position at which the length of the contour included in this circle, that is, the length of the contour clipped by this circle, becomes the maximum. Subsequently, the total number of disposed circles is counted, and "(the total number of disposed circles)×1 μm" is deemed as a length f (μm) of the bending ceramic portion 421. Next, as illustrated in FIG. 5B, in the obtained optical microscope image, three circles that are inscribed in the conductor portion 41 and include at least part of the bending ceramic portion 421 are drawn at positions different from each other, and the average of the diameters of the circles is calculated. Subsequently, the obtained average is divided by the observation magnification of the optical microscope image, and the obtained value is deemed as a thickness s (μm) of the conductor portion 41. At last, f/s calculated by dividing the obtained value of f by the value of s is deemed as the tortuosity of the bending ceramic portion 421.

The external electrodes 40 (40*a* and 40*b*) may be ones in which a plurality of materials having electrical conductivity are stacked over the surface of the conductor portion 41 and the ceramic portion 42. In the multilayer ceramic capacitor 100 according to the first embodiment illustrated in FIG. 1, the whole of the external electrodes 40 has a multilayer structure obtained by forming a Ni layer 44 and a Sn layer 45 in that order over the surface of the underlying layer 43 including the conductor portion 41 and the ceramic portion 42.

Modification Example (1)

Figure 6:
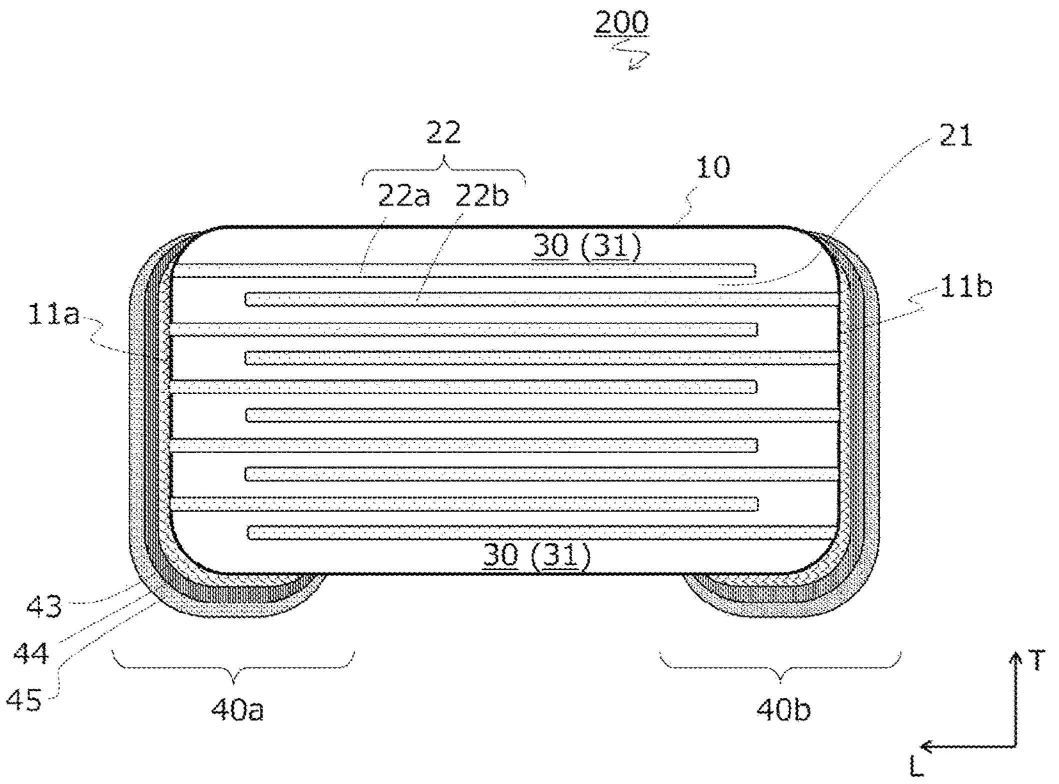
FIG. 6 is a schematic diagram (a sectional view along the length direction) illustrating a structure of a first modification example of the multilayer ceramic capacitor according to a first mode of the present disclosure.

As a first modification example of the multilayer ceramic capacitor according to the first mode, a multilayer ceramic capacitor 200 in which the external electrodes 40 (40*a* and 40*b*) are disposed into an L-shape in sectional view on the surface of the element body 10 like one illustrated in FIG. 6 is cited. The multilayer ceramic capacitor 200 with such a structure has an advantage that height reduction is possible because the external electrodes 40 are not extended over the upper cover layer.

Modification Example (2)

Figure 7:
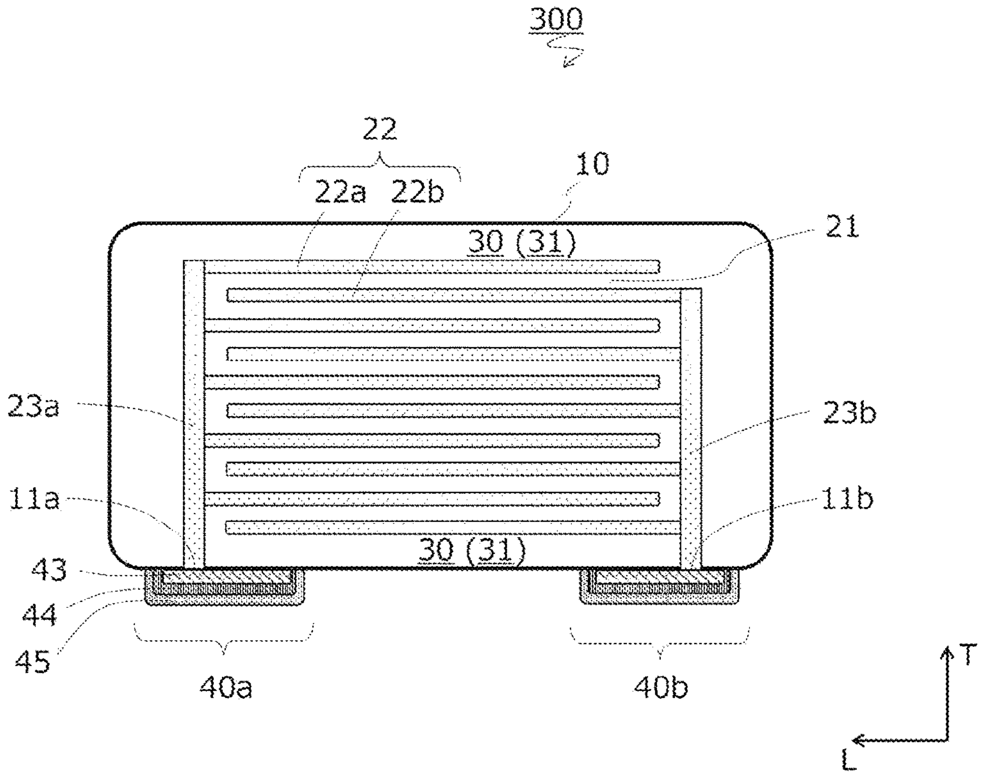
FIG. 7 is a schematic diagram (a sectional view along the length direction) illustrating a structure of a second modification example of the multilayer ceramic capacitor according to the first mode of the present disclosure.

As a second modification example of the multilayer ceramic capacitor according to the first mode, a multilayer ceramic capacitor 300 like one illustrated in FIG. 7 is cited. In this multilayer ceramic capacitor 300, connecting conductors 23 (23*a* and 23*b*) that electrically connect the internal electrodes 22 (22*a* and 22*b*) of the same polarity formed inside the element body 10 to each other are led out to one cover portion 31 and are made into the lead-out portions 11 (11*a* and 11*b*). The multilayer ceramic capacitor 300 with such a structure has an advantage that size reduction is possible because the external electrodes 40 (40*a* and 40*b*) are not present in the L direction and the W direction.

Modification Example (3)

Figure 8:
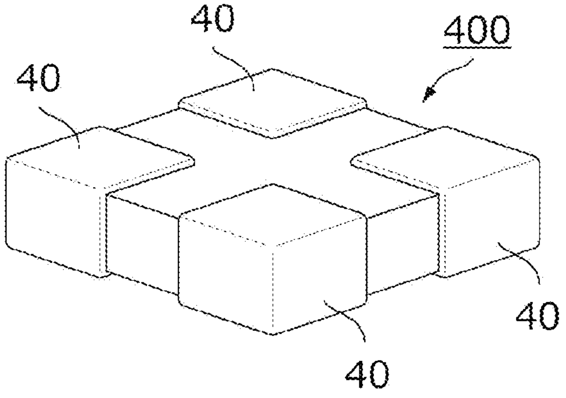
FIG. 8 is a schematic diagram (an overall perspective view) illustrating a structure of a third modification example of the multilayer ceramic capacitor according to the first mode.

As a third modification example of the multilayer ceramic capacitor according to the first mode, a multilayer ceramic capacitor 400 in which the external electrodes 40 are disposed at four places like one illustrated in FIG. 8 is cited. Also in the multilayer ceramic capacitor with such a structure, such effects of the present disclosure that generation of a crack in the cover layer attributed to concentration of stress from the outside can be suppressed and a short-circuit between terminal electrodes can also be suppressed are obtained.

Manufacturing Method of Multilayer Ceramic Capacitor

Second Embodiment

An embodiment of the manufacturing method of a multilayer ceramic capacitor according to a second mode of the present disclosure will be described below as a second embodiment.

The manufacturing method of a multilayer ceramic capacitor according to the second embodiment is to manufacture the multilayer ceramic capacitor according to the above-described first embodiment. The manufacturing method includes preparing powder of a dielectric ceramic composition, mixing the powder of the dielectric ceramic composition with a binder and shaping a mixture into a sheet shape to obtain a green sheet, and forming an internal electrode pattern containing a metal on the green sheet. The manufacturing method includes also obtaining a green multilayer body through executing pressure bonding after stacking a predetermined number of the green sheets on which the internal electrode pattern is formed and disposing green sheets for a cover layer at both end portions in the layer-stacking direction, dicing the green multilayer body to obtain a before-firing element body, and removing the binder from the before-firing element body. The manufacturing method includes also causing paste for an external electrode containing metal particles containing copper as a main component element and ceramic particles having composition similar to the composition of the dielectric ceramic composition to adhere to a surface of the before-firing element body resulting from the removal of the binder and firing the before-firing element body to which the paste for the external electrode adheres to obtain a sintered body. Detailed description will be made below regarding each operation.

[Preparation of Powder of Dielectric Ceramic Composition]

As the powder of the dielectric ceramic composition, commercially-available powder can be used as appropriate. In the case of self-manufacturing the dielectric ceramic composition, it suffices that various kinds of raw material powder containing the constituent elements thereof are mixed at a predetermined ratio and preliminary firing (pre-firing) is executed. When the various kinds of raw material powder are mixed at a predetermined ratio, the above-described additive elements and various additives such as a sintering auxiliary agent may be further added, and these various additives may be further added to the powder after the pre-firing.

(Fabrication of Green Sheet)

The green sheet is obtained by mixing the above-described powder of the dielectric ceramic composition with the binder and a dispersion medium to prepare slurry and shaping the slurry into a sheet shape.

As the binder, a binder that can keep the shape of the green sheet and volatilizes without leaving carbon and so forth by the binder removal treatment prior to the firing is used. As examples of the binder that can be used, polyvinyl alcohol-based, polyvinyl butyral-based, cellulose-based, urethane-based, and vinyl acetate-based binders are cited. The amount of use of the binder is also not particularly limited to any value. However, because the binder is removed in a post-process, it is preferable to make the amount as small as possible within a range in which expected formability and shape retention are obtained in terms of reduction in the raw material cost.

As the dispersion medium, a dispersion medium that does not cause aggregation of the pre-fired powder and the binder and can easily be removed through volatilization or the like after the green sheet shaping to be described later is used. As examples of the dispersion medium that can be used, water, alcohol-based solvents, and so forth are cited.

To the slurry, components that adjust properties of the slurry, such as dispersant, plasticizer, and thickener, may be added.

The method for mixing the above-described mixture powder with the binder and the dispersion medium is not particularly limited as long as it is a method by which the components are evenly mixed while mixing of impurities is prevented. As one example, ball mill mixing is cited.

As a method for shaping the prepared slurry into a sheet shape to obtain the green sheet, a commonly-used method such as a doctor blade method or a die coating method can be employed.

(Formation of Internal Electrode Pattern)

The formation of the internal electrode pattern containing a metal on the above-described green sheet can be executed by a method in which paste for the internal electrode is printed or applied onto the green sheet with a predetermined pattern or a method in which a metal film is formed on the green sheet with a predetermined pattern by evaporation or sputtering.

In the case of forming the internal electrode pattern by use of the paste for the internal electrode, the paste for the internal electrode to be used is obtained by mixing particles of the metal that forms the internal electrode and a vehicle in a three roll mill. The paste for the internal electrode may be paste containing glass frit or dielectric ceramic composition powder besides the above-described components.

The kind and the amount of a binder and a solvent contained in the vehicle to be used are also not limited and may be selected as appropriate in consideration of the viscosity of the paste for the internal electrode, easiness of handling, compatibility with the green sheet, and so forth.

Printing of the paste for the internal electrode onto the green sheet can be executed by use of a screen mask in which a predetermined internal electrode pattern is formed, for example. In the printing, the paste may be printed in such a manner that spaces to become the side margin portions when the multilayer ceramic capacitor is completed are left.

(Fabrication of Green Multilayer Body)

The green multilayer body is obtained by stacking a predetermined number of green sheets on which the internal electrode pattern is formed and executing pressure bonding of the green sheets to each other. The stacking and the pressure bonding may be executed by a commonly-used method, and it is possible to employ a method in which the stacked green sheets are pressed in the layer-stacking direction while being heated to execute thermocompression bonding by the action of the binder, or the like.

In the stacking and the pressure bonding, the green sheets to become the cover portions when the multilayer ceramic capacitor is completed are added to both end portions in the layer-stacking direction. In this case, the added green sheets may have the same composition as the green sheets on which the internal electrode pattern is printed or may have composition different from it. In terms of making the shrinkage ratio in firing uniform, it is preferable that the composition of the added green sheets be composition that is the same as or similar to that of the green sheets on which the above-described internal electrode precursor is disposed.

(Fabrication of Before-Firing Element Body)

The before-firing element body is obtained by dicing in which the green multilayer body is divided into individual element body shapes. For the dicing, commonly-used means such as a dicing saw or a laser cutting machine can be employed. After the green multilayer body is diced and surfaces in which the internal electrode precursor is exposed are formed, these surfaces may be coated with a material for forming the side margin portions to make the before-firing element body.

(Removal of Binder)

For the obtained before-firing element body, the binder is volatilized and removed by heating. The heating condition may be set as appropriate in consideration of the volatilization temperature and the content of the binder. As one example, keeping the before-firing element body in a nitrogen ($N_2$) atmosphere at a temperature of 200° C. to 500° C. for 5 to 20 hours is cited.

(Adhesion of Paste for External Electrode)

The paste for the external electrode containing the metal particles containing copper as the main component element and the ceramic particles having composition similar to that of the dielectric ceramic composition contained in the before-firing element body is made to adhere to the surface of the before-firing element body from which the binder has been removed in such a manner as to cover the lead-out portions.

The paste for the external electrode to be used is obtained by mixing the metal particles containing copper as the main component element and the ceramic particles having composition similar to that of the dielectric ceramic composition contained in the before-firing element together with a vehicle by a three roll mill. The paste for the external electrode may be paste containing glass frit besides the above-described components. The content of each component in the paste for the external electrode is not particularly limited. However, in terms of forming a sufficient amount of bending ceramic portion in the external electrode, it is preferable to set the content ratio of the ceramic particles with respect to the solid content equal to or higher than 5 mass %, and it is more preferable to set the content ratio equal to or higher than 10 mass %. On the other hand, in terms of making the external electrode excellent in the electrical conductivity, it is preferable to set the content ratio of the ceramic particles with respect to the solid content equal to or lower than 30 mass %, and it is more preferable to set the content ratio equal to or lower than 25 mass %.

It suffices that the kind of contained elements of the ceramic particles to be used corresponds with that of the main component of the dielectric ceramic composition used for the fabrication of the green sheet. In terms of reducing thermal stress generated at a time of firing and in terms of enhancing the bonding strength between the bending ceramic portion and the element body in the obtained multilayer ceramic capacitor and improving the effect of suppression of the thermal stress applied to the element body, it is preferable that the ceramic particles to be used are ones in which the kind of contained elements corresponds with that of all elements contained in the dielectric ceramic composition used for the fabrication of the green sheet, and it is more preferable that the ceramic particles to be used are ones in which even the ratio of each of contained elements corresponds with that of the dielectric ceramic composition.

The kind and the amount of a binder and a solvent contained in the vehicle to be used are not limited and may be selected as appropriate in consideration of the viscosity of the paste for the external electrode, easiness of handling, and so forth.

As the method for the adhesion of the paste for the external electrode, for example, immersing (dipping) part of the before-firing element body in a bath of the paste for the external electrode, applying the paste for the external electrode to the surface of the before-firing element body, and so forth are cited.

(Firing of Before-Firing Element Body)

The firing of the before-firing element body is executed by heating the before-firing element body to which the paste for the external electrode is made to adhere to a predetermined temperature. The condition of the firing is set in consideration of the sinterability of the metal particles and the ceramic particles contained in the paste for the external electrode. This is because it is anticipated that the bending ceramic portion in the external electrode is formed through sintering of the ceramic particles after the occurrence of turning of the metal particles contained in the paste for the external electrode to a spherical shape and rearrangement of the ceramic particles in association with this in the firing. It is preferable to consider also the sinterability of the dielectric ceramic composition, the heat resistance, and oxidation resistance of the metal contained in the paste for the internal electrode, and so forth for the setting of the firing condition. As an example of the firing condition, keeping the before-firing element body for 1 to 20 hours at a temperature lower than 1084° C., which is the melting point of Cu, in a reducing atmosphere in which nitrogen ($N_2$), hydrogen ($H_2$), and water vapor ($H_2O$) are mixed is cited. After the firing, reoxidation treatment in which the fired element body is kept at 500° C. to 900° C. in a nitrogen ($N_2$) gas atmosphere or a low oxygen atmosphere may be executed. By the firing, the particles that configure the dielectric ceramic composition powder are sintered to become the dielectric layers and the protective portion, and the internal electrode patterns are sintered to become the internal electrodes, and the paste for the external electrode is sintered to become the external electrodes. Furthermore, at this time, the bending ceramic portions are formed in the external electrodes.

The sintered body obtained by the firing may be deemed as the multilayer ceramic capacitor as it is, or may be deemed as the multilayer ceramic capacitor after an electrically-conductive layer is formed on the surfaces of the external electrodes by plating, evaporation, or other methods. The multilayer ceramic capacitor obtained in this manner has the structure illustrated in FIG. 1 and FIG. 2, FIG. 6, or FIG. 8.

Modification Example (1) of Second Embodiment

In the second embodiment, in order to form a connecting conductor pattern inside the element body, through-holes may be formed in the green sheet prior to the formation of the internal electrode pattern. As the method for forming the through-holes in the green sheet, punching, laser processing, or the like can be employed. The green sheet in which conductors penetrate in the thickness direction is obtained by forming the internal electrode pattern on the green sheet in which the through-holes are formed or filling the through-holes with the conductors separately from the internal electrode pattern.

When the green sheets in which the conductors penetrate in the thickness direction are stacked to be made into the green multilayer body, the conductors in the through-holes link to each other in the layer-stacking direction and are connected to the internal electrode pattern formed on the green sheet adjacent in the layer-stacking direction to form precursors of the connecting conductors. At this time, by forming through-holes filled with conductors also in one of the green sheets for the cover layer, part of the precursors of the connecting conductors is exposed in the surface of the cover layer.

Modification Example (2) of Second Embodiment

In the second embodiment, precursors of the connecting conductors may be formed by forming holes to which the internal electrode patterns are led out in wall surfaces in the thickness direction (layer-stacking direction) of the green multilayer body obtained by stacking and pressure-bonding the green sheets and filling the holes with conductors.

The multilayer ceramic capacitors obtained on the basis of the respective modification examples of the second embodiment have the structure illustrated in FIG. 7.

Working Example

The present disclosure will be described below more specifically on the basis of a working example. However, the present disclosure is not limited to this working example.

Working Example

As powder of a dielectric ceramic composition, calcium zirconate ($CaZrO_3$) powder (average grain size of 0.5 μm) that had been pre-fired was prepared. A polyvinyl butyral-based binder and an alcohol-based solvent were added to this powder, and wet ball mill mixing was executed. Obtained mixed slurry was shaped by a doctor blade to obtain green sheets. As paste for the internal electrode, Cu paste containing 10 mass % of the same kind of $CaZro_3$ powder as that used for the green sheets in the solid content was prepared. Screen printing of the Cu paste on the green sheets was executed to form internal electrode patterns. Then, 16 layers of the green sheets were stacked. Moreover, 10 green sheets for the cover layer were overlapped on each of the upper and lower surfaces of the 16 stacked green sheets. Thereafter, the green sheets were pressurized at a pressure of approximately 100 MPa while being heated to execute pressure bonding and obtain a green multilayer body. This green multilayer body was diced to obtain a before-firing element body in which the internal electrode patterns of every second layer were led out to surfaces that were parallel to the layer-stacking direction and were opposed to each other. Then, this before-firing element body was heated to 300° C. in a nitrogen atmosphere to execute debinder treatment. As paste for the external electrode, Cu paste containing 15 weight % of the same kind of $CaZro_3$ powder as that used for the green sheets in the solid content was prepared. The surfaces to which the internal electrode patterns were led out in the before-firing element body resulting from the debinder treatment were each dipped into a bath of the paste for the external electrode, and the paste for the external electrode was made to adhere to the whole of these surfaces and part of the surfaces adjacent to them. The before-firing element body to which the paste for the external electrode adhered was fired through being kept at 1000° C. for two hours and 30 minutes in a what is generally called reducing-water vapor atmosphere made by introducing water vapor into a reducing gas containing hydrogen in nitrogen. Then, the temperature was lowered to the vicinity of the room temperature, and a sintered body was obtained. A Ni layer and a Sn layer were formed in that order by plating over the surfaces of the external electrodes of the obtained sintered body, so that a multilayer ceramic capacitor according to working example 1 was obtained. In the obtained multilayer ceramic capacitor, the length (L direction size) was 0.4 mm, and the width (W direction size) was 0.2 mm, and the height (T direction size) was 0.2 mm.

Comparative Example

A multilayer ceramic capacitor according to a comparative example was fabricated by a method similar to the working example except that the temperature in the firing was set to 900° C.

[Evaluation of Multilayer Ceramic Capacitor]

(Check of Presence of Bending Ceramic Portion in External Electrode)

Each of the obtained multilayer ceramic capacitors was cut along a plane that passed through the vicinity of a central portion in the width direction (W direction) and was parallel to the layer-stacking direction (T direction), and was buried in a resin, with the section exposed. Then, mirror surface polishing of the section was executed to form a polished surface. The external electrode portion in the polished surface was observed with an optical microscope, and presence of the bending ceramic portion was checked. As a result, in the multilayer ceramic capacitor according to the working example, as illustrated in FIG. 3, the presence of the ceramic portions that penetrated the conductor portion was confirmed, and all of them were the bending ceramic portions. In contrast, in the multilayer ceramic capacitor according to the comparative example, although the presence of the ceramic portions that penetrated the conductor portion was confirmed, all of them had a columnar shape, and what corresponded to the bending ceramic portion are not present.

(Measurement of Tortuosity of Bending Ceramic Portion)

The tortuosity of the bending ceramic portions was measured by the above-described method, regarding the multilayer ceramic capacitor according to the working example. As a result, the range of the distribution thereof was from 1.39 to 4.44.

From the above result, the following fact can be geometrically understood. In the multilayer ceramic capacitor according to the working example, in which the ceramic portions that penetrated the conductor portion were the bending ceramic portions, even when a gap was generated between the conductor portion and the bending ceramic portion, infiltration of deterioration factors such as water was suppressed compared with the multilayer ceramic capacitor according to the comparative example, in which the ceramic portions had a columnar shape.

In the present specification, the following techniques are also disclosed.

(Note 1)

A multilayer ceramic capacitor including:

an element body having

- a multilayer body in which dielectric layers formed of a dielectric ceramic and internal electrodes containing a metal as a main component are stacked alternately, and
- a protective portion that covers a surface of the multilayer body; and an external electrode that is disposed on a surface of the element body and is electrically connected to the internal electrodes, the external electrode having a conductor portion formed of a metal containing copper as a main component element and a ceramic portion formed of a ceramic material having composition similar to composition of the dielectric ceramic, in which a bending ceramic portion that is disposed to penetrate between a surface in contact with the element body in the conductor portion and a surface opposed to the surface and in which a path of the penetration bends is included in the ceramic portion.

(Note 2)

The multilayer ceramic capacitor according to (Note 1), in which a tortuosity of the path that penetrates the conductor portion regarding the bending ceramic portion is equal to or higher than 1.1 and equal to or lower than 7.0.

(Note 3)

The multilayer ceramic capacitor according to (Note 1) or (Note 2), in which the metal in the internal electrodes contains copper as a main component element.

(Note 4)

A manufacturing method of the multilayer ceramic capacitor according to any one of (Note 1) to (Note 3), the manufacturing method including:

preparing powder of a dielectric ceramic composition;

mixing the powder of the dielectric ceramic composition with a binder and shaping a mixture into a sheet shape to obtain a green sheet;

forming an internal electrode pattern containing a metal on the green sheet;

obtaining a green multilayer body through executing pressure bonding after stacking a predetermined number of the green sheets on which the internal electrode pattern is formed and disposing green sheets for a cover layer at both end portions in a layer-stacking direction;

dicing the green multilayer body to obtain a before-firing element body;

removing the binder from the before-firing element body;

causing paste for an external electrode containing metal particles containing copper as a main component element and ceramic particles having composition similar to composition of the dielectric ceramic composition to adhere to a surface of the before-firing element body resulting from the removal of the binder; and firing the before-firing element body to which the paste for the external electrode adheres to obtain a sintered body.

INDUSTRIAL APPLICABILITY

According to the present disclosure, it is possible to provide a multilayer ceramic capacitor in which generation of a crack at a time of mounting on a circuit board and at a time of use is suppressed and infiltration of deterioration factors via an external electrode is suppressed. Such a multilayer ceramic capacitor is useful in that it has high reliability, high durability, and a long lifetime.

It should be understood by those skilled in the art that various modifications, combinations, sub-combinations and alterations may occur depending on design requirements and other factors insofar as they are within the scope of the appended claims or the equivalent thereof.

What is claimed is:

1. A multilayer ceramic capacitor comprising:

an element body having a multilayer body in which dielectric layers formed of a dielectric ceramic and internal electrodes containing a metal as a main component are stacked, and a protective portion that covers a surface of the multilayer body; and an external electrode that is disposed on a surface of the element body and is electrically connected to the internal electrodes, wherein the external electrode has a conductor portion formed of a metal containing copper as a main component element and a ceramic portion formed of a ceramic material, the ceramic portion includes a bending ceramic portion, the bending ceramic portion is disposed to penetrate between a surface in contact with the element body in the conductor portion and a surface opposed to the surface in contact with the element body, and a path of the penetration of the bending ceramic portion bends in the conductor portion.

2. The multilayer ceramic capacitor according to claim 1, wherein a tortuosity of the path that penetrates the conductor portion is equal to or higher than 1.1.

3. The multilayer ceramic capacitor according to claim 1, wherein a tortuosity of the path that penetrates the conductor portion is equal to or higher than 1.1 and equal to or lower than 7.0.

4. The multilayer ceramic capacitor according to claim 1, wherein the metal in the internal electrodes contains copper as a main component element.

5. The multilayer ceramic capacitor according to claim 1, wherein the ceramic portion contains components common to those of the dielectric layers.

6. The multilayer ceramic capacitor according to claim 1, wherein the dielectric layers contain calcium zirconate as a main component.

7. The multilayer ceramic capacitor according to claim 1, wherein the dielectric layers contain barium titanate as a main component.

8. A manufacturing method of the multilayer ceramic capacitor according to claim 1, the manufacturing method comprising:

preparing powder of a dielectric ceramic composition;

mixing the powder of the dielectric ceramic composition with a binder and shaping a mixture into a sheet shape to obtain a green sheet;

forming an internal electrode pattern containing a metal on the green sheet;

obtaining a green multilayer body through executing pressure bonding after stacking a predetermined number of green sheets on which the internal electrode pattern is formed and disposing green sheets for a cover layer at both end portions in a layer-stacking direction;

dicing the green multilayer body to obtain a before-firing element body;

removing the binder from the before-firing element body;

causing paste for the external electrode containing metal particles containing the copper as the main component element and ceramic particles having composition similar to composition of the dielectric ceramic composition to adhere to a surface of the before-firing element body resulting from the removal of the binder; and firing the before-firing element body to which the paste for the external electrode adheres to obtain a sintered body.

* * * * *